United States Patent
Kumanan et al.

(10) Patent No.: US 7,512,522 B2
(45) Date of Patent: Mar. 31, 2009

(54) METHODS AND APPARATUS FOR ASSESSING HEALTH OF MEMORY UTILIZATION OF A PROGRAM

(75) Inventors: Nedumaran Palani Kumanan, Cortland Manor, NY (US); Nicholas Matthew Mitchell, White Plains, NY (US); Edith Gail Schonberg, New York, NY (US); Gary Seth Sevitsky, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 11/680,003

(22) Filed: Feb. 28, 2007

(65) Prior Publication Data

US 2008/0208530 A1 Aug. 28, 2008

(51) Int. Cl.
*G06F 19/00* (2006.01)
(52) U.S. Cl. ............... 702/186; 340/500; 340/540; 340/679; 702/182; 702/187; 707/200
(58) Field of Classification Search ................. 340/500, 340/540, 635, 657, 679; 702/1, 127, 182, 702/186, 187, 189; 707/200; 710/1, 15, 710/18, 19; 711/100, 170, 173
See application file for complete search history.

(56) References Cited

U.S. PATENT DOCUMENTS

| | | | |
|---|---|---|---|
| 5,408,650 A | | 4/1995 | Arsenault |
| 5,832,068 A | * | 11/1998 | Smith ............. 379/114.14 |
| 5,936,786 A | * | 8/1999 | Go ............. 360/72.2 |
| 6,158,024 A | | 12/2000 | Mandal |
| 6,185,653 B1 | * | 2/2001 | Yanai et al. ............. 711/4 |
| 2006/0218144 A1 | * | 9/2006 | Randal ............. 707/6 |

OTHER PUBLICATIONS

G. Ammons et al., "Exploiting Hardware Performance Counters with Flow and Context Sensitive Profiling," ACM SIGPLAN Conference on Programming Language Design and Implementation, Jun. 1997, 12 pages, Nevada.

J. Berdine et al., "Shape Analysis for Composite Data Structures," Technical Report MSR-TR-2007-13, Microsoft Research, Jan. 2007, 15 pages, Washington.

S.M. Blackburn et al., "The DaCapo Benchmarks: Java Benchmarking Development and Analysis," Proceedings of the 21st Annual ACM SIGPLAN Conference on Object-Oriented Programming, Systems, Languages and Applications (OOPSLA), Oct. 2006, 22 pages, Oregon.

(Continued)

*Primary Examiner*—Edward R Cosimano
(74) *Attorney, Agent, or Firm*—Anne V. Dougherty; Ryan, Mason & Lewis, LLP (57) ABSTRACT

Techniques for assessing the utilization efficiency of a portion of memory are provided. One or more images of a portion of memory are obtained. The one or more memory elements found within each image are categorized into one or more application-neutral categories, wherein the one or more categories distinguish between data and structural overhead. At least one analysis is performed on the one or more categorized memory elements of the one or more images using a measure representative of the efficiency of utilization of the portion of memory. The one or more results of the analysis step are outputted.

20 Claims, 11 Drawing Sheets

OTHER PUBLICATIONS

M.D. Bond et al., "Bell: Bit-Encoding Online Memory Leak Detection," Architectural Support for Programming Languages and Operating Systems (ASPLOS), Oct. 2006, 12 pages, California.

A.B. Brown et al., "A Model of Configuration Complexity and its Application to a Change Management System," Proceedings of the 9th IFIP/IEEE International Symposium on Integrated Network Management, May 2005, 14 pages, France.

P.N. De Souza et al., "The Maxima Book," http://maxima.sourceforge.net, Sep. 2004, pp. 1-155.

B. Dufour et al., "Dynamic Metrics for Java," Object-Oriented Programming, Systems, Languages and Applications (OOPSLA), Oct. 2003, pp. 149-168, California.

M.J. Harrold et al., "An Empirical Investigation of Program Spectra," SIGPLAN/SIGSOFT Workshop on Program Analysis for Software Tools and Engineering, Jun. 1998, pp. 83-90, Canada.

R. Hastings et al., "Purify: Fast Detection of Memory Leaks and Access Errors," Usenix Proceedings, 1992, 10 pages.

M. Jump et al., "Cork: Dynamic Memory Leak Detection for Garbage-Collected Languages," Symposium on Principles of Programming Languages (POPL), Jan. 2007, 8 pages, France.

N. Mitchell, "The Runtime Structure of Object Ownership," European Conference on Object-Oriented Programming (ECOOP), 2006, 25 pages.

N. Mitchell et al., "LeakBot: An Automated and Lightweight Tool for Diagnosing Memory Leaks in Large Java Applications," European Conference on Object-Oriented Programming, Jul. 2003, 26 pages.

N. Mitchell et al., "Data Structure Health," International Workshop on Dynamic Analysis, May 2007, 7 pages, Minnesota.

N. Mitchell et al., "Modeling Runtime Behavior in Framework-Based Applications," European Conference on Object-Oriented Programming, Jul. 2006, 24 pages, New York.

S. Pheng et al., "Dynamic Data Structure Analysis for Java Programs," International Conference on Program Comprehension, Jun. 2006, pp. 1-11, Canada.

D. Rayside et al., "A Dynamic Analysis for Revealing Object Ownership and Sharing," Workshop on Dynamic Analysis, (WODA), May 2006, 7 pages, China.

R. Shaham et al., "Automatic Removal of Array Memory Leaks in Java," Computational Complexity, 2000, 16 pages.

T. Xie et al., "Checking Inside the Black Box: Regression Testing Based on Value Spectra Differences," Proceedings of the 20th IEEE International Conference on Software Maintenance, Sep. 2004, pp. 28-37, Illinois.

T. Yang et al., "Automatic Heap Sizing: Taking Real Memory Into Account," International Symposium on Memory Management (ISMM), Oct. 2004, 12 pages, Canada.

* cited by examiner

| 300 | category | explanation | # bytes |
|---|---|---|---|
| | primitive | prim. array elements, prim. fields | 1-8 |
| | header | space imposed by VM | 12 |
| | pointer | references between objects | 4 |
| | null | unused pointers | 4 |

| | |
|---|---|
| primitive | 16 |
| header | 38 |
| pointer | 8 |
| null | 8 |
| total | 70 |

| category | explanation | example |
|---|---|---|
| head | head of a collection | Hashtable |
| array | array backbone | Hashtable$Entry[] |
| entry | list-style element | Hashtable$Entry |
| contained | anything else | Char[] |

Java's LinkedList of LinkedLists of Objects, each with a single byte field

FIG. 11B

GNU Trove's TLinkedList of TLinkedLists of Objects, each with a single byte field

METHODS AND APPARATUS FOR ASSESSING HEALTH OF MEMORY UTILIZATION OF A PROGRAM

FIELD OF THE INVENTION

The present invention is related to techniques for assessing utilization of memory of a program. More particularly, the present invention categorizes and analyzes multiple images of memory to determine how efficiently an application is using memory.

BACKGROUND OF THE INVENTION

Regardless of the recent advances in memory speed and size, software developers continue to struggle with efficient memory usage. Today, applications or, more generally, programs, are incredibly robust and they require excessive amounts of memory to meet performance and functional goals. Excessive/inordinate memory usage occurs for various reasons. One major reason is that software developers often construct or implement data models without understanding the implications of these decisions on memory as the program runs. More particularly, software developers may create frameworks in ways not intended by framework developers, and vice versa. Additional opportunities for inefficient memory use occur in the deployment stage of software, when a developer must establish policies on caching mechanisms (e.g., cache capacity and time-out intervals). Even with sufficient planning, a developer cannot clearly assess the run-time consequences of coding and/or deployment decisions because it is difficult to achieve a good balance of dynamic time and space trade-offs while only having source code and framework documentation.

The key to evaluating the efficiency of a program is to assess memory use. Attempts have been made to evaluate memory usage by sizing up the data structures found within the memory. However, these attempts apply a strictly static notion of size. Conventional techniques consider data structures in the sense of the C language, i.e., the size of a structure is the sum of those fields statically defined by structure type. Unfortunately, this method fails to provide any useful information on the overall efficiency of memory usage.

Current conventional techniques utilize three types of memory content summaries. First, there are tools which show the size of data structures within memory. Second, there are tools which create histograms of the content within memory. Third, there are tools that allow the user to browse the contents of the memory. These approaches are impractical for a number of reasons. For example, the techniques are either too coarse in their description of memory, as in the first summary, or too detailed, as in the third summary. Their main shortfall is the inability to create a useful summary for assessing efficient memory use.

SUMMARY OF THE INVENTION

Principles of the present invention provide techniques for assessing the utilization of a portion of memory and, more particularly, techniques for categorizing and analyzing multiple images of memory to assess the memory use of a program.

In accordance with one aspect of the invention, a technique for assessing the utilization efficiency of a portion of memory is provided. One or more images of a portion of memory are obtained. The one or more memory elements found within each image are categorized into one or more application-neutral categories, wherein the one or more categories distinguish between data and structural overhead. At least one analysis is performed on the one or more categorized memory elements of the one or more images using a measure representative of the efficiency of utilization of the portion of memory. One or more results of the analysis step are then outputted.

The step of categorizing the one or more memory elements may include the step of labeling the one or more memory elements in accordance with at least one of an instance health analysis and a collection health analysis. Furthermore, the step of analyzing the one or more memory elements may include the steps of creating a matrix and applying a judgment scheme to the matrix, wherein the judgment scheme defines one or more entries of the matrix.

These and other objects, features, and advantages of the present invention will become apparent from the following detailed description of illustrative embodiments thereof, which is to be read in connection with the accompanying drawings.

DETAILED DESCRIPTION OF THE INVENTION

As will be illustrated in detail below, principles of the present invention provide techniques for assessing the utilization of a portion of memory. More specifically, an embodiment of the present invention includes techniques for categorizing and analyzing multiple images, or snapshots, of memory to assess the memory usage of an application. The principles of the present invention will be illustrated herein in conjunction with an exemplary technique for assessing the utilization of a portion of memory.

The term "memory element" as used herein is intended to be construed broadly so as to encompass, by way of example and without limitation, any piece of data held in memory.

The term "image" or "snapshot" as used herein is intended to be construed broadly so as to encompass, by way of example and without limitation, the state of memory and its components, in part or in whole, at a particular time and/or over a period of time, which may be derived from data gathered from one or more runs, and in combination with source code information.

The term "application-neutral" as used herein is intended to be construed broadly so as to encompass, by way of example and without limitation, a characterization that is independent of the design of an application, which can be used to compare applications created by different developers. By way of one example of the use of the term, a "pointer" is an application-neutral category because its function is independently understood, regardless of the application design.

There is a general realization that current conventional techniques have limited ability in assessing memory because of their inability to determine "reasonable" memory use. The following example depicts this problem:

Assume that one data structure consumes 100 megabytes of memory, while another data structure consumes 200 megabytes of memory. Although the second data structure is twice as large as the first, assume that the smaller data structure consists of 50% pointers between objects and 50% actual data being stored in the structure, while the second data structure devotes only 5% to pointers and 95% to actual data stored in its structure. Therefore, the 100 megabyte structure, although smaller, is distinctly more "bloated" because it devotes much more of its total size to the infrastructure of linking objects together. Conventional methods of assessing memory do not give developers the ability to evaluate applications in a manner as described in this example.

Figure 1:
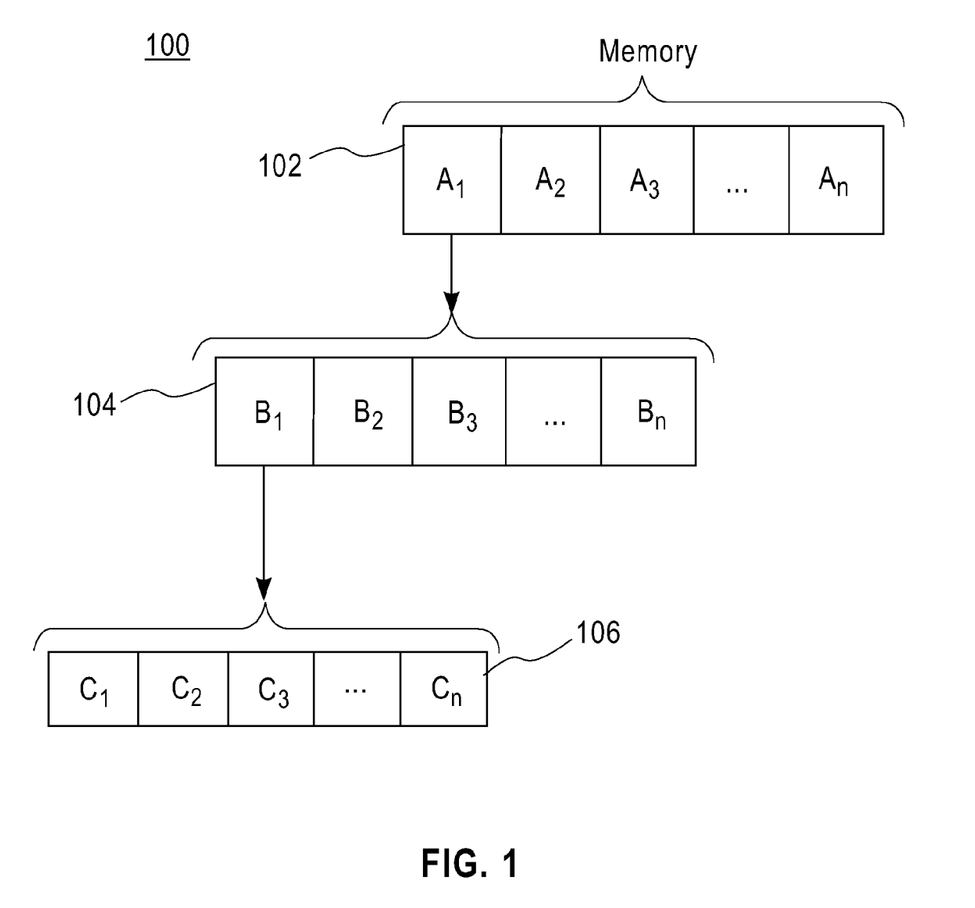
FIG. 1 is a diagram illustrating an example data model of a portion of memory, according to an embodiment of the present invention.

Referring initially to FIG. 1, a diagram illustrates an example data model of a portion of memory, according to an embodiment of the present invention. The makeup of memory depends on the design of data types, and the way instances of these types are linked together. Consider FIG. 1, an example data model 100 with entities or memory elements A 102, B 104, and C 106. Each instance of C ($C_1 \ldots C_n$) has a single byte field. Each instance of B ($B_1 \ldots B_n$) contains one or more C instances. And each instance of A ($A_1 \ldots A_n$) has one or more B instances. In order to assess memory usage, developers must map this model to a physical implementation. In an object oriented language, one typically maps each entity to a class via a standard collection, such as the Java LinkedList, to store the multi-valued relationship. In an embodiment of the present invention, each instance of C contains only one byte of application data, as opposed to, for example, the Java Virtual Machine (Java VM) which imposes 12-20 bytes of object header.

Figure 2:
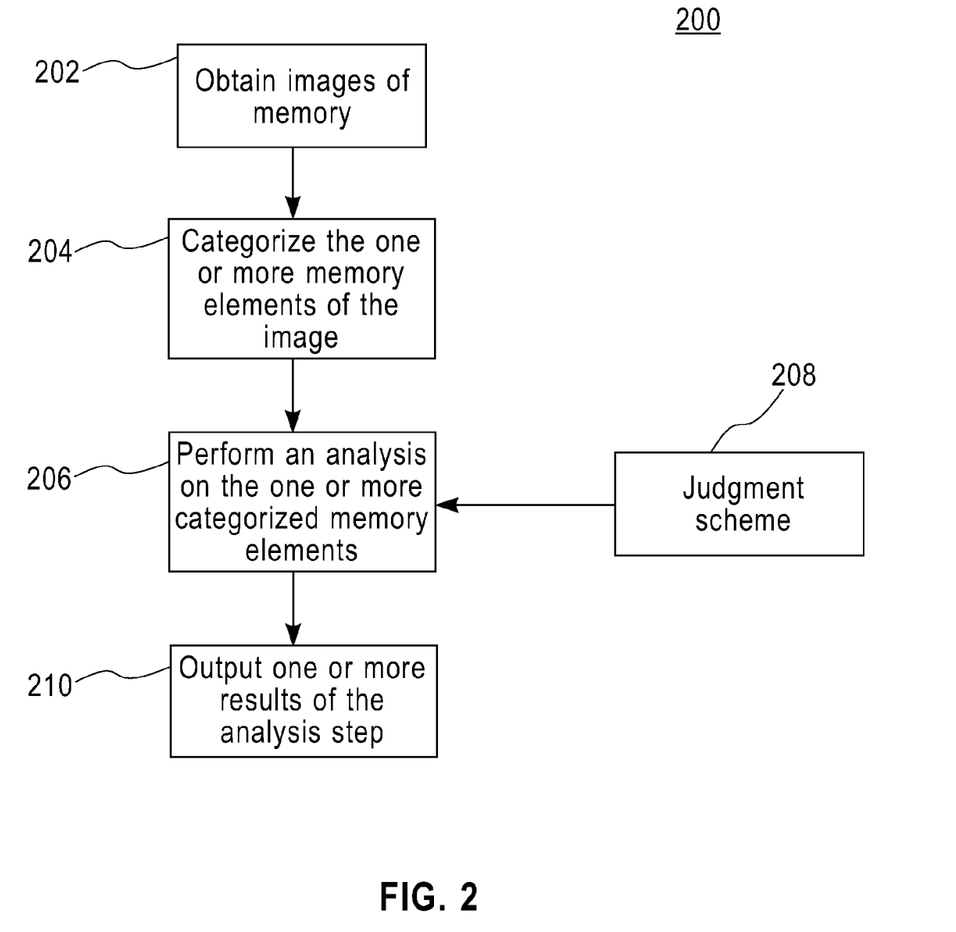
FIG. 2 is a flow diagram illustrating a methodology for assessing the utilization efficiency of a portion of memory, according to an embodiment of the present invention.

Referring now to FIG. 2, a flow diagram illustrates a methodology for assessing the utilization efficiency of a portion of memory, according to an embodiment of the present invention. Methodology 200 begins in block 202 where one or more images (snapshots) of a portion of memory are obtained. The one or more images can be obtained via a heap snapshot, an object allocation profile over a period of time, source code information, or a combination thereof. The images of memory are taken during the execution of an application, under conditions that the user wishes to study. The conditions may include times when one or more programs are being executed simultaneously. In block 204, the one or more memory elements found within each image are categorized into one or more application-neutral categories, wherein the one or more categories distinguish between data and structural overhead. An application-neutral categorization system gives a developer the ability to compare the efficiency of his or her application to another functionally similar application.

According to an embodiment of the present invention, the application-neutral categories are in accordance with an instance health analysis and/or a collection health analysis. An instance health analysis involves labeling bytes of memory according to function. A collection health analysis involves labeling objects in a data collection. A software developer can assess memory utilization, or memory health, by carrying out an instance health analysis or a collection health analysis, or both. A more detailed description of block 204 is provided in FIGS. 3-8. In block 206, at least one analysis is performed on the one or more categorized memory elements of the one or more images using a measure or judgment scheme 208 representative of the efficiency of utilization of the portion of memory. In additional embodiments of the present invention, the at least one analysis can include analyzing transient memory elements (e.g., short-lived objects), persistent memory elements (e.g., long-lived objects), or both, to determine memory use efficiency. More detailed descriptions of blocks 206 and 208 are provided in FIGS. 9-11. In block 210, one or more results of the analysis step are then outputted.

Figure 3:
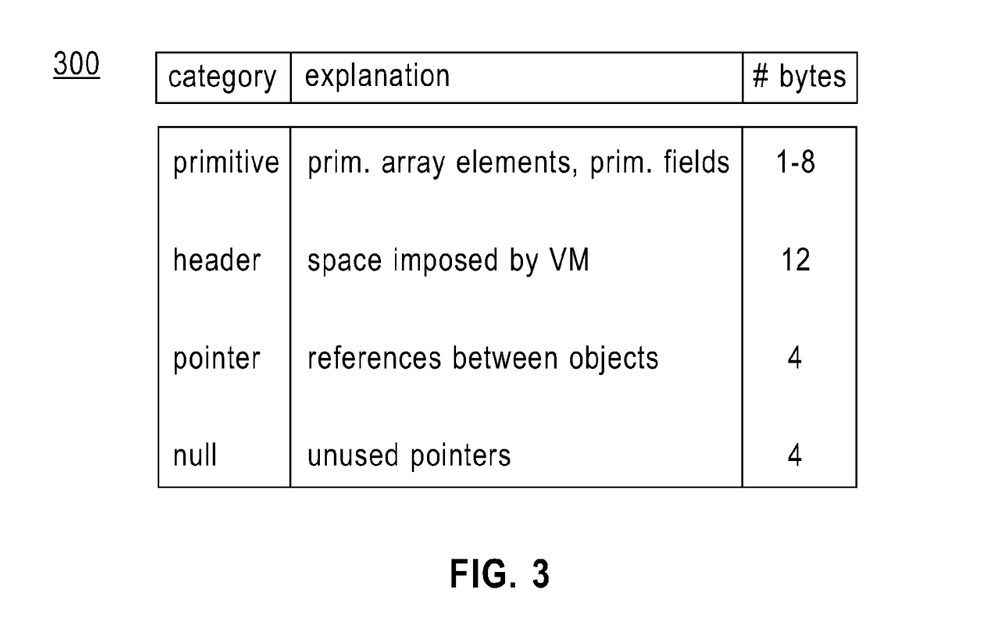
FIG. 3 is a table illustrating categories of an instance health analysis with sizes for a typical 32-bit Java VM, according to an embodiment of the present invention.

Referring now to FIG. 3, table 300 illustrates categories of an instance health analysis with sizes for a typical 32-bit Java VM, according to an embodiment of the present invention. Every instance of a data-type consumes a certain number of bytes in a runtime heap. Some of these bytes reflect storage for the data-type of the instance variables, some store information needed by the underlying runtime, for garbage collection or lightweight synchronization. According to an embodiment of the present invention, the bytes are categorized by the purpose those bytes serve. FIG. 3 shows four categories of instance health. The primitive category covers all primitive data, which includes primitive data fields of objects and arrays of primitive data. In a Java example, each primitive element consumes anywhere from one to eight bytes. The header category accounts for the bookkeeping information that the Java runtime sets aside to help manage each object, commonly termed "object header." In a Java example, each header element consumes 12 bytes under 32-bit addressing. The pointer category covers bytes set aside for pointers between objects. In a Java example, each pointer slot, whether from a field of an object or from an array of pointers, consumes four bytes, whether or not the pointer refers to an extant object, or to null. The null category covers the common case of when an application allocates an array with some default capacity, but only makes use of a smaller number of elements during the course of its run; the null case. The null case can be identified by comparing multiple images of the categorized memory elements to determine the transient and persistent memory elements. Furthermore, the developer can compare an image of memory to a running program(s) source code.

Figure 4:
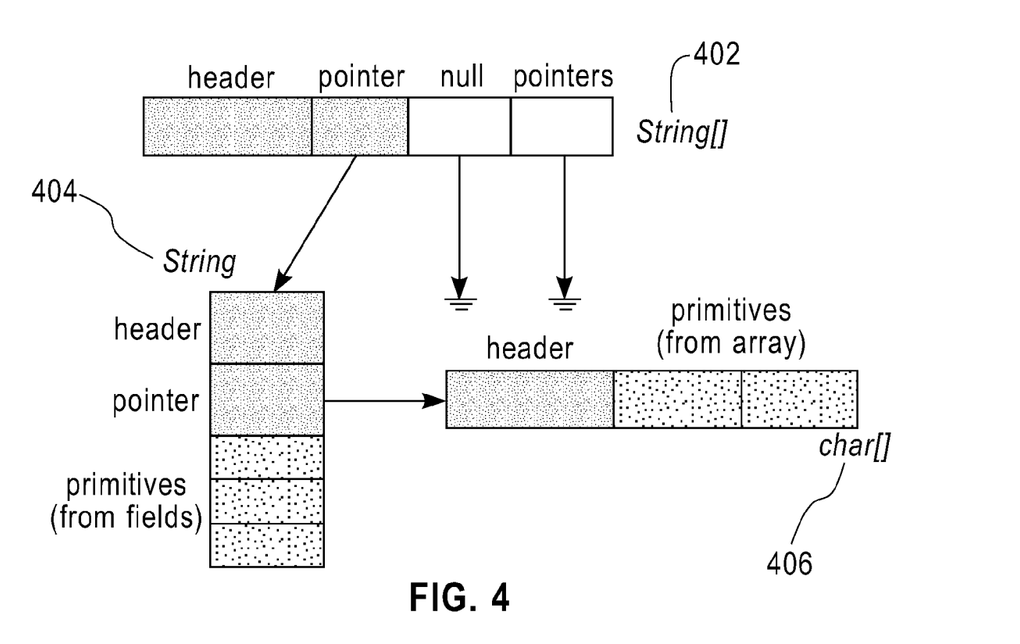
FIG. 4 is a diagram illustrating labeling of memory elements in accordance with an instance health analysis, according to an embodiment of the present invention.
Figure 5:
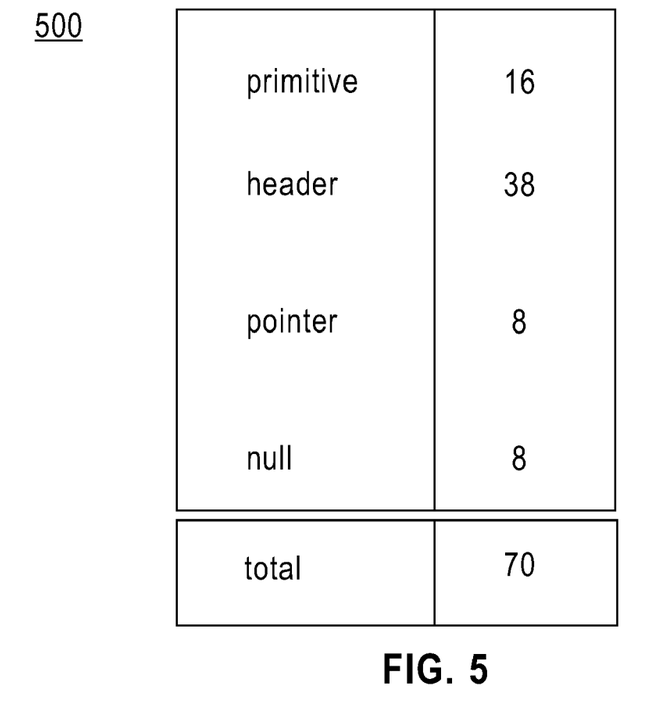
FIG. 5 is a table illustrating instance health categories and the number of bytes occupied by each data-type for a given example, according to an embodiment of the present invention.

Referring now to FIG. 4, a diagram illustrates the labeling of memory elements in accordance with an instance health analysis, according to an embodiment of the present invention. FIG. 4 shows a Java string object array 402, the one string in that array 404, and the character array object which underlies that string 406. Referring now to FIG. 5, table 500 illustrates instance health categories and the number of bytes occupied by each data-type for the Java example. On a 32-bit platform with 12-byte object headers, this example will consume a total of 70 bytes: 38 from object headers, eight from pointers, eight from null pointers, and only 16 from primitive data. Of those 16 bytes, only four bytes come from the true data of this structure: the two characters in the character array of the string. To come to this conclusion requires an additional categorization of objects that distinguishes the string from the character array. However, an instance health analysis alone can provide substantial memory assessment information.

Figure 6:
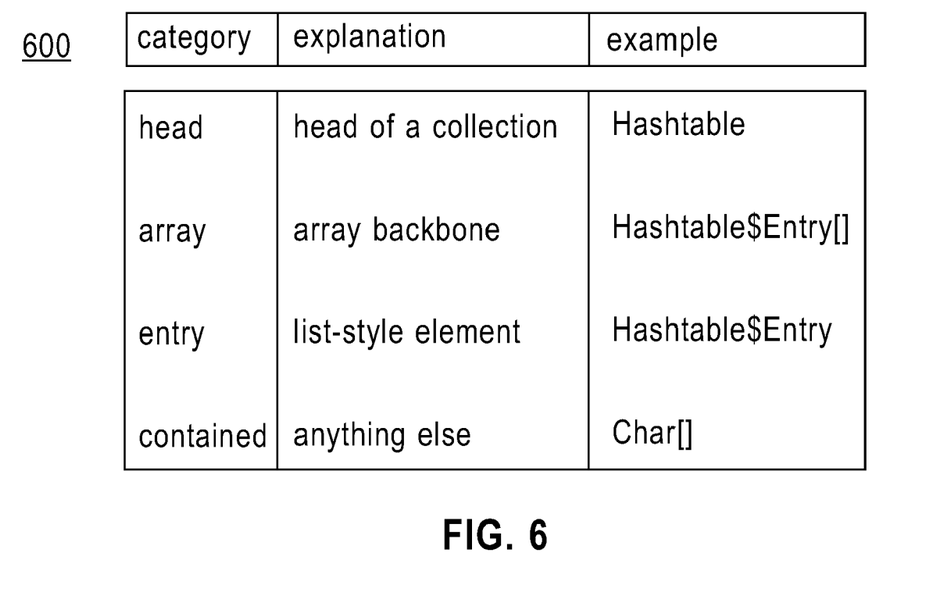
FIG. 6 is a table illustrating categories of a collection health analysis, according to an embodiment of the present invention.

Referring now to FIG. 6, table 600 illustrates categories of a collection health analysis, according to an embodiment of the present invention. A collection health analysis refers to the way individual objects are linked together into larger collections. Within every collection, there is actual data. In less efficiently organized applications, the actual data only occupies a small fraction of the total collection size. Everything other than actual data represents infrastructure data and, therefore, infrastructure costs. This dichotomy, between actual data and collection infrastructure, is the basis for the collection health analysis. Whereas the instance health breaks down the bytes of each instance, the collection health analysis categorizes the objects of a collection. FIG. 6 depicts four primary collection categories. The head category refers to heads of collections, which includes any instance that points to an array or entry instance. The array category refers to the "backbones" of a collection that allow the collection to contain a variable number of object, more specifically, a backbone that allows for append-only random access is categorized as an array. The entry category refers to a special type of backbone that allows for random insertion and deletion or allows for more complex recursive structures. The contained category refers to any non-infrastructure instances found inside collections, which means anything that is not a head, array, or entry.

Figure 7:
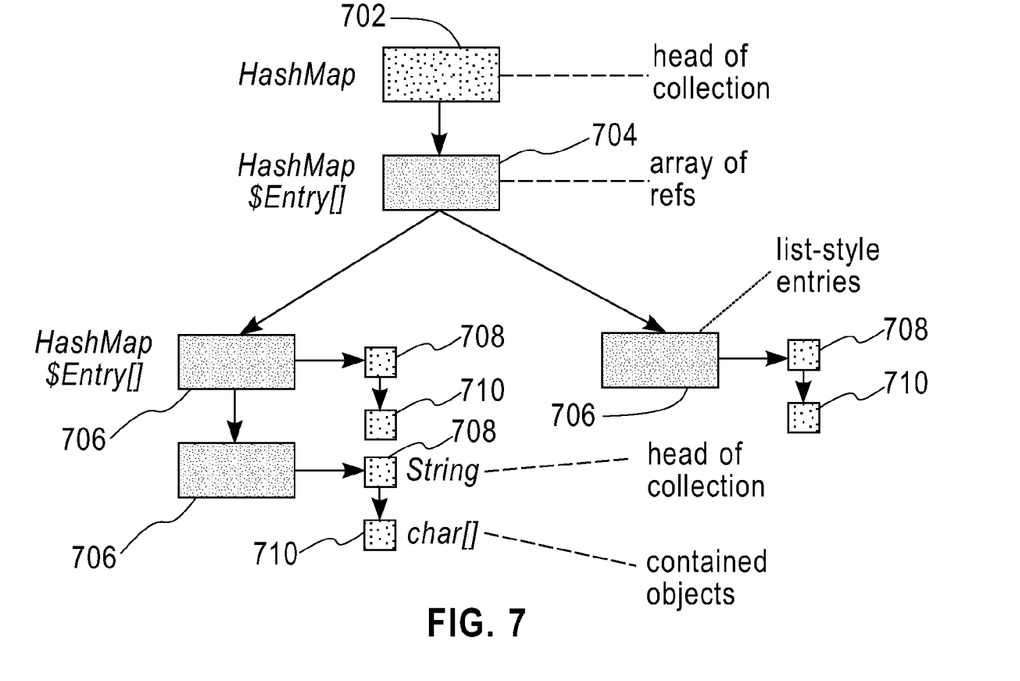
FIG. 7 is a diagram illustrating labeling of memory elements in accordance with a collection health analysis, according to an embodiment of the present invention.

Referring now to FIG. 7, a diagram illustrates labeling of memory elements in accordance with a collection health analysis, according to an embodiment of the present invention. FIG. 7 shows a heap that contains a hashmap whose keys and values are Java strings, and the strings in turn contain character arrays. In the example, we consider the case where the key and value point to the same object, and show only a single edge to the strings, to reduce cluster in the figure. The top-most node in the figure, representing HashMap 702, falls into the head category. Strings 708 also fall into the head category, since they refer to the arrays of primitive characters. HashMap$Entry[ ] 704 falls within the array category because it is an array of references and HashMap$Entry 706 fall within the entry category because they are list-style entries. Char[ ] objects 710 fall within the contained category because they are contained objects. The goal is to map every object to a single category. However, sometimes an object can fall under more than one category as is the case in nested collections. For example, if a collection contains other collections, each collection head is also a contained object. In an embodiment of the present invention, we prioritize the categories, to ensure that each object falls into one category; array and entry categories are given first priority, followed by head, and then contained objects. In this way, all of the LinkedList objects in a list of lists will be considered to be heads of collections.

Figure 8:
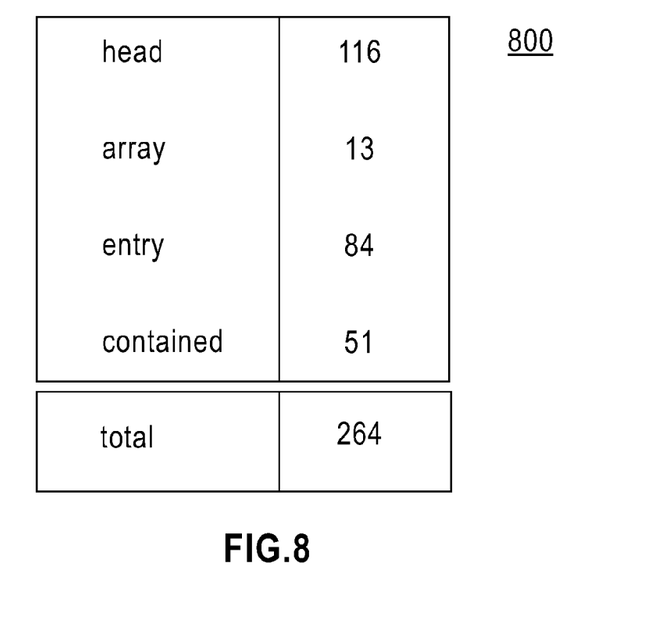
FIG. 8 is a table illustrating collection health categories and the number of bytes occupied by each data-type for a given example, according to an embodiment of the present invention.

Referring now to FIG. 8, table 800 illustrates collection health categories and the number of bytes occupied by each data-type for the given example, according to an embodiment of the present invention. Using instance sizing information from Java 1.5, the example heap found at FIG. 7 consumes a total of 264 bytes. Of that, 116 bytes belong to the head category which includes three strings 708 at 28 bytes each and one hash map 702; 13 bytes belong to the array category which includes a four-element array 704; 84 bytes belong to the entry category which includes three hash map entry objects 706; and 51 bytes belong to the contained category which includes three two-element primitive arrays 710.

The composition of instance health and collection health allow us to study the role of instance bytes in the context of a collection. For example, bytes that seem to be excessive (e.g., having a high fraction of pointer bytes), may come from objects with a necessary purpose (e.g., offering random insertion). Conversely, bytes that seem reasonable (e.g., primitive data) may come mostly from objects that are not strictly necessary, and that one did not realize would incur such a great memory overhead. With four categories in each categorization system, a health signature is a 4×4 matrix. Each entry is the number of byes in the intersection of a collection health category and an instance health category. By itself, a health signature imposes no value judgments that resolve whether a distribution of memory is good or bad. For a developer experienced with the code base and with memory health analysis, a health signature can provide a necessary level of detail for quick problem resolution. For developers new to the code or to analysis, a summary that incorporates some amount of a priori judgment may be necessary.

Figure 9:
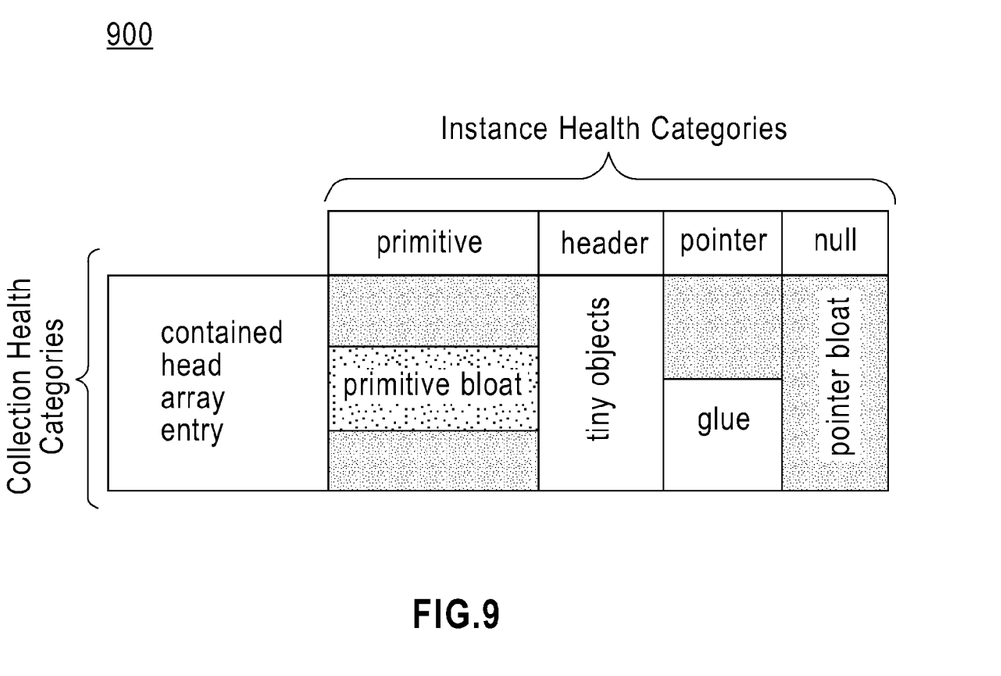
FIG. 9 is a diagram illustrating a judgment scheme matrix, according to an embodiment of the present invention.

Referring now to FIG. 9, a diagram illustrates a judgment scheme matrix 900, according to an embodiment of the present invention. This may be considered a detailed description of block 208 in FIG. 2. FIG. 9 is one example of a judgment scheme that allows a developer to quickly compare a large number of implementations. For instance, a developer would be inclined to judge primitive data, whether from record fields or primitive array entries, as useful data (at least more so than empty array slots). As an example, a string instance in Java has three primitive integer fields: a hash code memo for the string, the strings length, and an offset, in case the underlying characters are shared. In contrast to the primitive data in the character array of the string, these bits of primitive data are various aspects of infrastructure. So the judgment scheme may consider contained-primitive bytes as "actual data" and bytes for three primitive integer fields of string instances as head-primitive data, which is a type of "primitive bloat." Furthermore, entry-primitive bytes can be categorized as actual data because they combine entry functionality and contained functionality into a single data type. Header bytes, which contain a small number of fields, can be categorized as "tiny objects." Pointer bytes in array or entry objects can be categorized as "glue" because they hold objects together. And any other pointer and null bytes are considered "pointer bloat" because they signify unnecessary reserved bytes.

Figure 10:
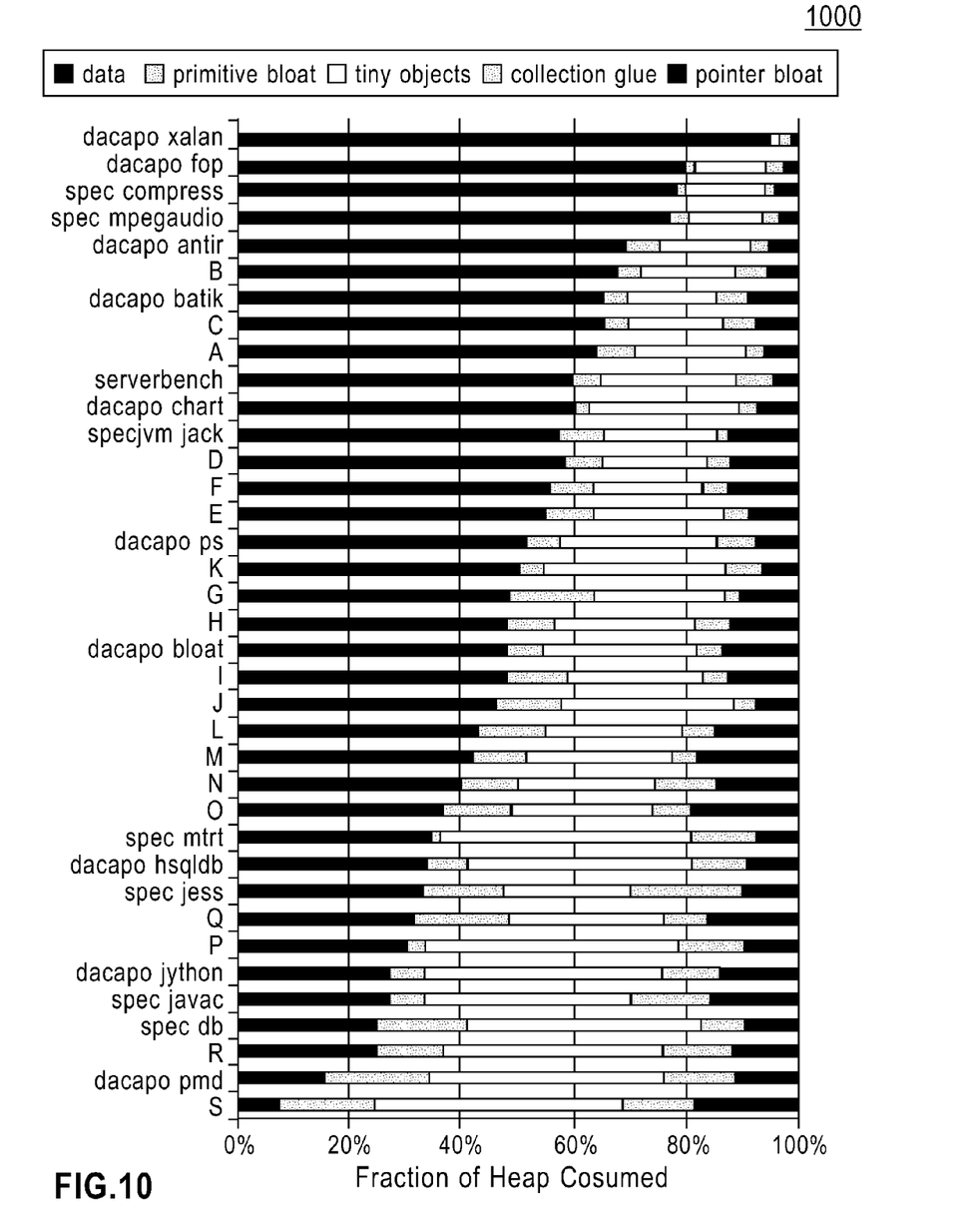
FIG. 10 is a diagram illustrating health signatures of multiple applications using the judgment scheme depicted in FIG. 9, according to an embodiment of the present invention.

Referring now to FIG. 10, a diagram illustrates health signatures of multiple applications 1000 using the judgment scheme found at FIG. 9, according to an embodiment of the present invention. The diagram includes health signatures from two benchmark suites, SPECJVM98 and DaCapo. Furthermore, the diagram includes under-test and deployment servers, and standalone and Eclipse-based clients.

The analysis performed on the categorized memory elements is not limited to a judgment scheme matrix. In an additional embodiment of the present invention, the categories can be applied to various analysis schemes. An asymptotic analysis can illuminate the consequences of design and implementation decisions on memory health. Studying how health varies as input data size increases offers a developer predictive power. For example, if memory health remains largely unchanged with more than 500 users logged on to a server, this can help in limiting the amount of data to collect. An asymptotic analysis emphasizes the inefficiencies of certain design choices. Ideally, memory health should improve as input size increases because fixed infrastructure costs are amortized over increasingly larger amounts of data. However, with nested collections this may not be the case.

Consider a linked list that stores data structures and each data structure has a collection health categorization of ten bytes of head and 20 bytes of entry. Furthermore, assume that the linked list itself imposes four bytes of entry per contained structure and eight bytes of head. With one contained structure, the relevant portion of the collection health categorization, (head, entry), will be (18, 24), or (0.43, 0.57) in normalized terms. With two contained structures, the absolute categorization is (28, 48), or (0.37, 0.63). Now assume that the contained structures impose 100 bytes of head and 200 bytes of entry. With one contained structure, collection health categorization is (108, 204), or (0.35, 0.65). With two contained structures, the categorization is (208, 408), or (0.34, 0.66). With bigger contained structures, the categorization changes more slowly, but, in either case it approaches an asymptotic value. With N entries, the asymptotic categorization in the second case will be $\lim_{N \to \infty}(100N+10, 204N)$. Thus, the normalized categorization approaches $$\left(\frac{100}{304}, \frac{204}{304}\right),$$

or (0.33, 0.67). In the first case, the normalized categorization approaches (0.29, 0.71). Also, observe that the larger the contained structure the closer the asymptotic value will be to the one-entry value.

Figure 11A:
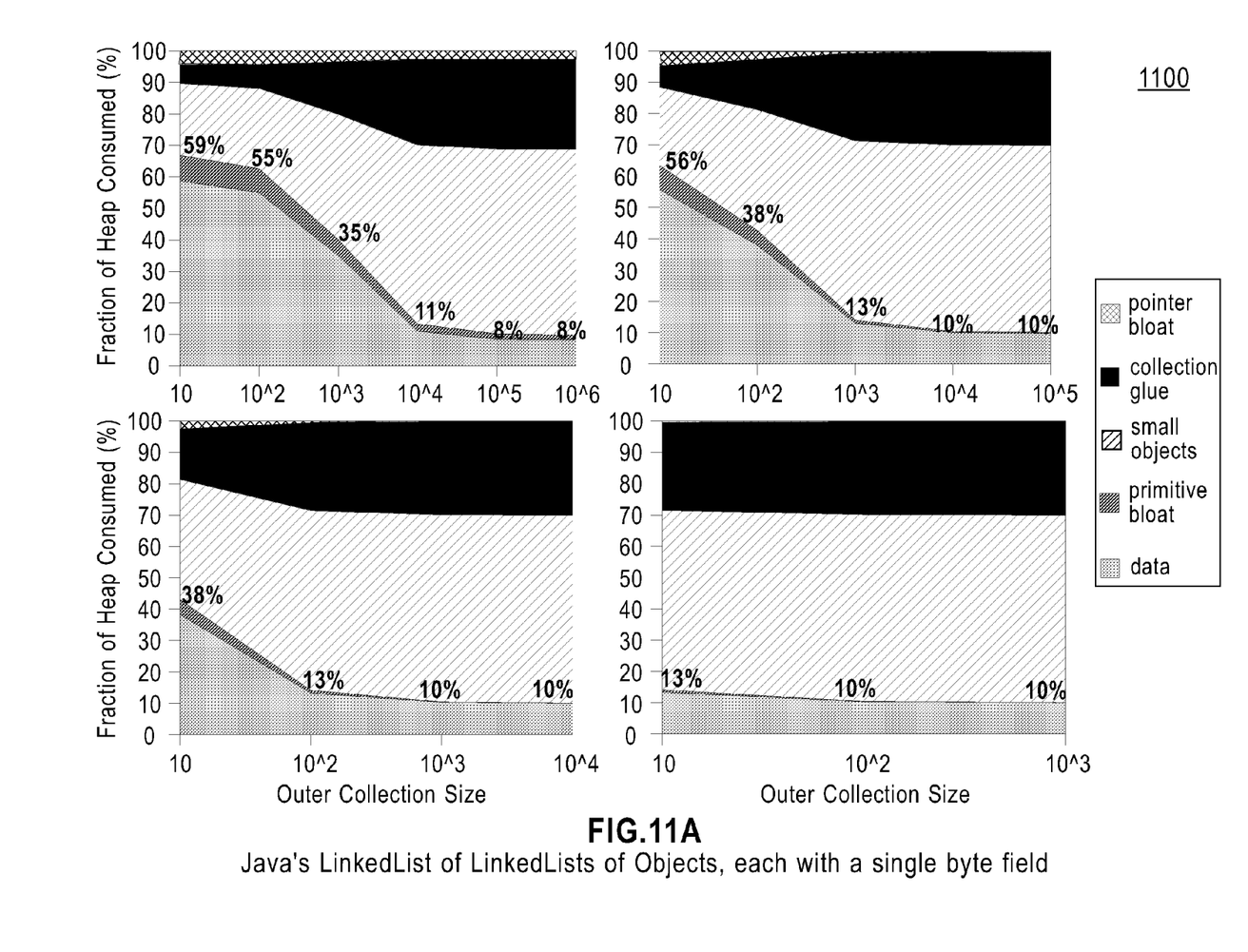
FIGS. 11A, 11B and 11C are diagrams illustrating asymptotic behavior of memory health for three different types of primitive byte collections, according to an embodiment of the present invention.
Figure 11B:
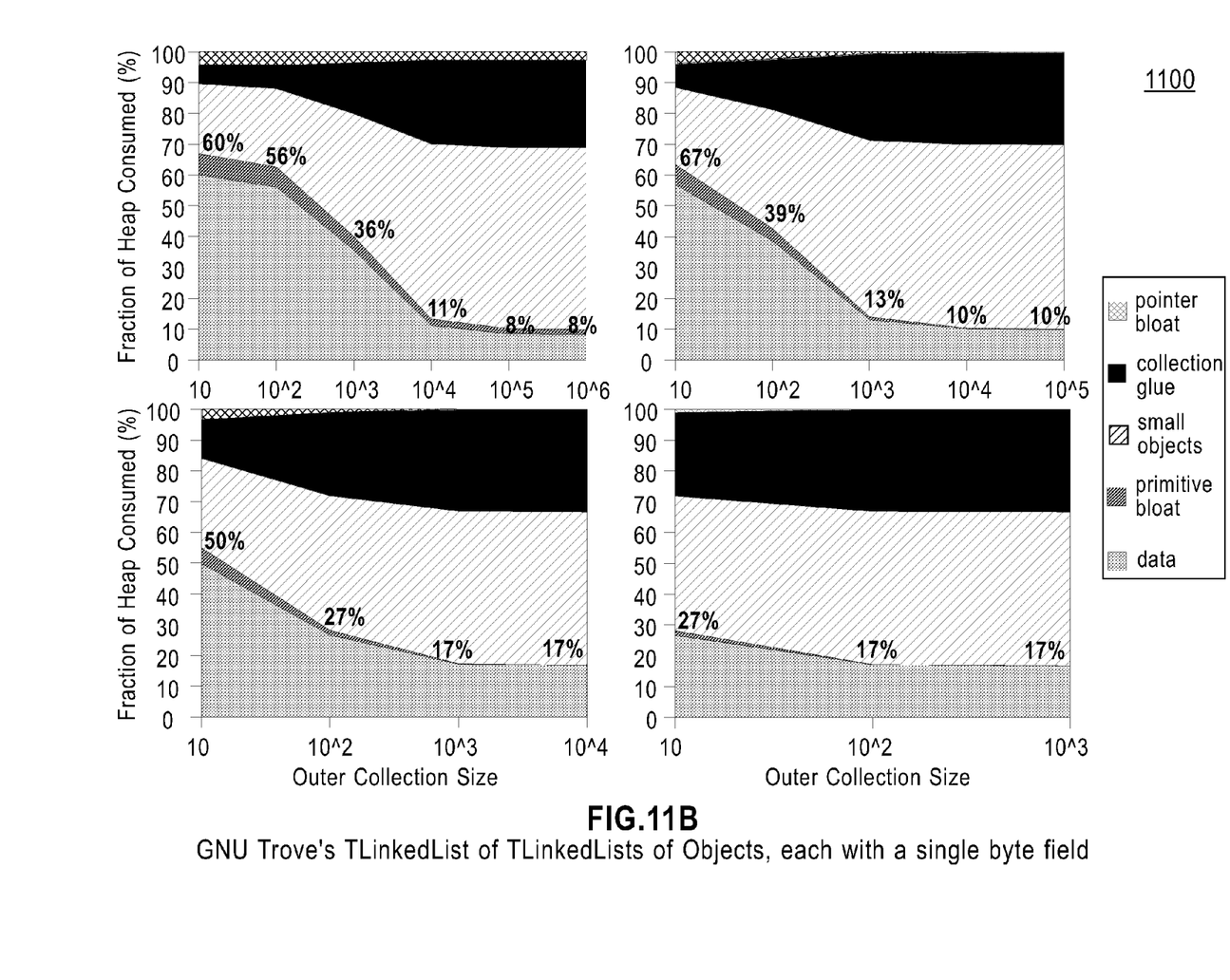
Figure 11C:
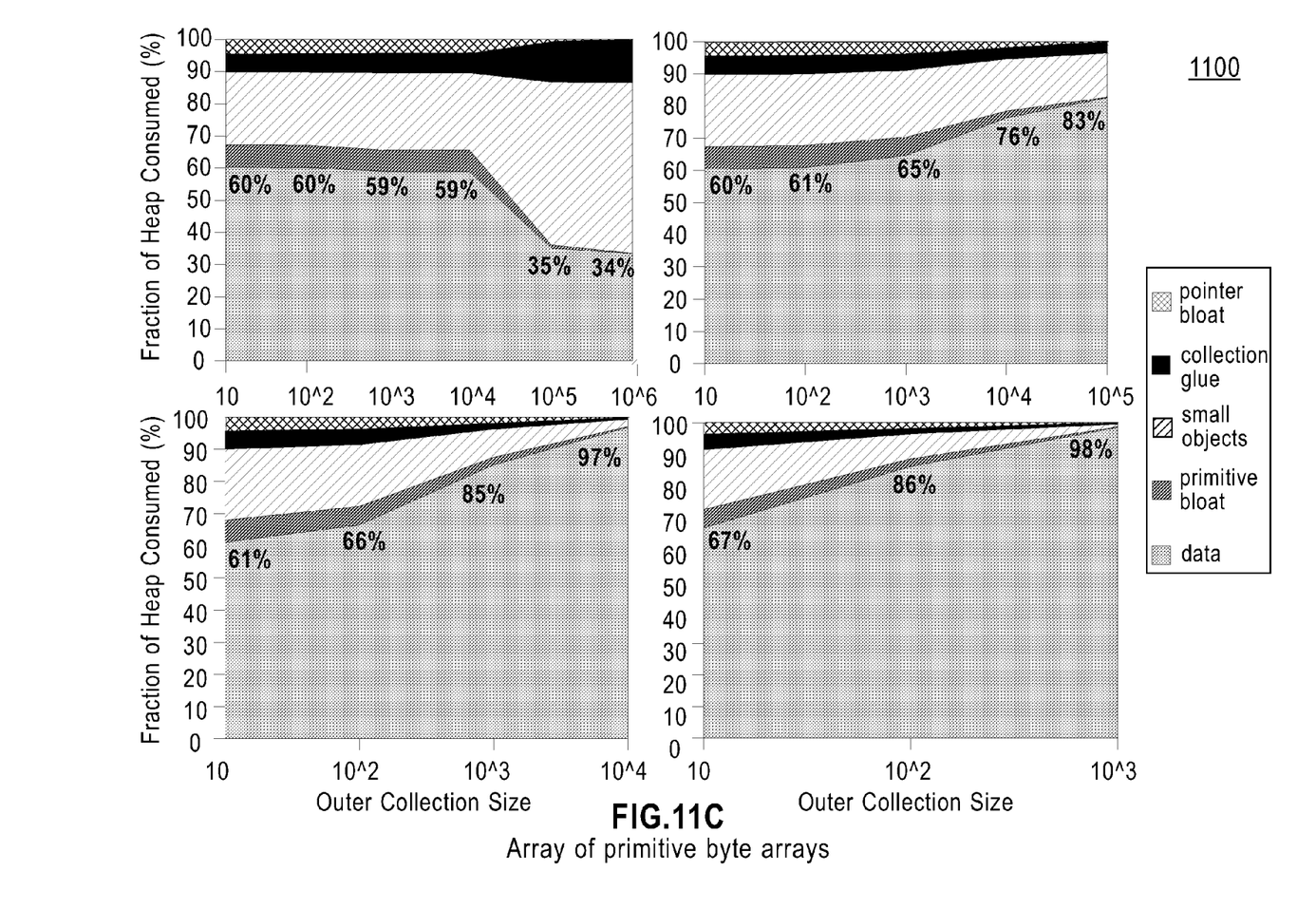

Referring now to FIGS. 11A, 11B and 11C, diagrams illustrate asymptotic behavior of memory health for three different types of primitive byte collections, according to an embodiment of the present invention. FIGS. 11A, 11B and 11C show the asymptotic behavior of three implementations of a collection of collections of primitive bytes. The first set of graphs in FIG. 11A use the standard Java LinkedList collection for both the outer and the inner collections, and a distinct type T to store the primitive byte field; a LinkedList of LinkedLists of instance of T. The second set of graphs in FIG. 11B use the same shape, but replaces the Java list implementation with one from GNU Trove. The third set of graphs in FIG. 11C use an array of primitive byte arrays. The x-axis of each chart plots an increasing size of the outer collection and the four columns of charts show the behavior of an inner collection size of 10, $10^2$, $10^3$, and $10^4$. The fraction of data in each chart has been annotated. For example, the standard Java LinkedList approaches 8-10% data and the Trove implementation approaches 8-17% data. Due to the design of these structures, the health grows worse as the outer collection increases in size and there is little benefit from increasing inner collection size. Since the design of the structures is poor, Trove improves health only by a small amount. In contrast, the array of primitive byte arrays scales in a much more healthy way. The asymptotic health ranges from 34-98%. Furthermore, with large inner collections, there is an improvement in health as data size increases.

Figure 12:
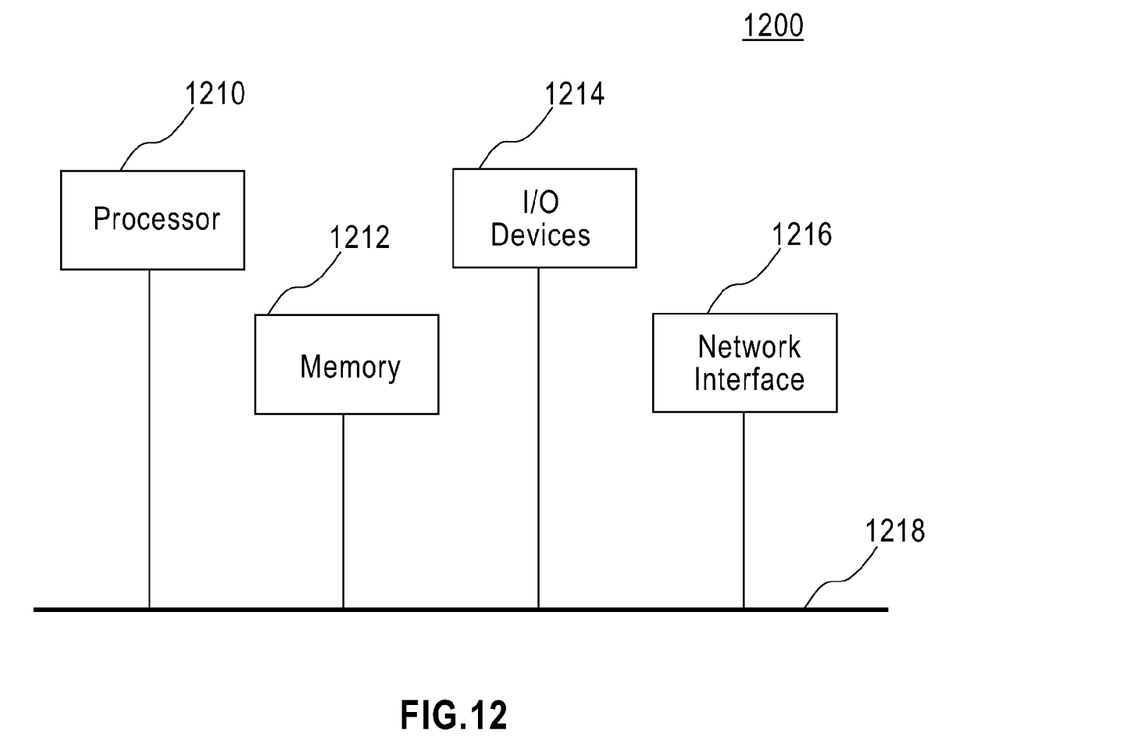
FIG. 12 is a diagram illustrating an illustrative hardware implementation of a computing system in accordance with which one or more components/methodologies of the present invention may be implemented, according to an embodiment of the present invention.

Referring now to FIG. 12, block diagram 1200 illustrates an exemplary hardware implementation of a computing system in accordance with which one or more components/methodologies of the invention (e.g. components/methodologies described in the context of FIGS. 1-10, 11A, 11B and 11C) may be implemented, according to an embodiment of the present invention.

As shown, the techniques for assessing the utilization of a portion of memory may be implemented in accordance with a processor 1210, a memory 1212, I/O devices 1214, and a network interface 1216, coupled via a computer bus 1218 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of assessing the utilization efficiency of a portion of memory, comprising the steps of:
   obtaining one or more images of a portion of memory;
   categorizing the one or more memory elements within each image into one or more application-neutral categories, wherein the one or more categories distinguish between data and structural overhead;
   performing at least one analysis of the one or more categorized memory elements of the one or more images using a measure representative of the efficiency of utilization of the portion of memory; and
   outputting one or more results of the analysis step.

2. The method as recited in claim 1, wherein the one or more images are obtained during the operation of one or more programs.

3. The method as recited in claim 1, wherein the one or more images are obtained using source code of one or more running programs.

4. The method as recited in claim 1, wherein the step of performing at least one analysis comprises the step of comparing one or more images from one or more runs of one or more programs.

5. The method as recited in claim 1, wherein the at least one analysis is asymptotic.

6. The method as recited in claim 1, wherein the step of performing at least one analysis comprises the step of analyzing one or more transient memory elements.

7. The method as recited in claim 1, wherein the step of performing at least one analysis comprises the step of analyzing one or more persistent memory elements.

8. The method as recited in claim 1, wherein the step of categorizing the one or more memory elements comprises the step of labeling the one or more memory elements in accordance with at least one of:
an instance health analysis; and
a collection health analysis.

9. The method as recited in claim 8, wherein the step of labeling the one or more memory elements in accordance with an instance health analysis comprises labeling the one or more memory elements as at least one of an object header, primitive data, a pointer, and an empty array slot.

10. The method as recited in claim 8, wherein the collection health analysis is applied to one or more nested data collections.

11. The method as recited in claim 8, wherein the step of labeling the one or more memory elements is in accordance with the instance health analysis and the collection health analysis, wherein the step of analyzing comprises the steps of:
creating a matrix; and
applying a judgment scheme to the matrix, wherein the judgment scheme defines one or more entries of the matrix.

12. The method as recited in claim 8, wherein the step of labeling the one or more memory elements in accordance with a collection health analysis comprises labeling the one or more memory elements as at least one of a collection head, an array, a list-style entry object, and a contained object.

13. The method as recited in claim 12, wherein a collection head is data that dominates a list-style entry object or an array of instances.

14. The method as recited in claim 12, wherein a contained object is data that is dominated by a collection head.

15. An apparatus for assessing the utilization efficiency of a portion of memory, the apparatus comprising:
a memory; and
at least one processor coupled to the memory and operative to: (i) obtain one or more images of a portion of memory; (ii) categorize the one or more memory elements within each image into one or more application-neutral categories, wherein the one or more categories distinguish between data and structural overhead; (iii) perform at least one analysis of the one or more categorized memory elements of the one or more images using a measure representative of the efficiency of utilization of the portion of memory; and (iv) outputting one or more results of the analysis step.

16. The apparatus as recited in claim 15, wherein the step of categorizing the one or more memory elements comprises the step of labeling the one or more memory elements in accordance with at least one of:
an instance health analysis, wherein the one or more memory elements are labeled as at least one of an object header, primitive data, a pointer, and an empty array slot; and
a collection health analysis, wherein the one or more memory elements are labeled as at least one of a collection head, an array, a list-style entry object, and a contained object.

17. The apparatus as recited in claim 15, wherein the step of labeling the one or more memory elements is in accordance with the instance health analysis and the collection health analysis, wherein the step of analyzing comprises the steps of:
creating a matrix; and
applying a judgment scheme to the matrix, wherein the judgment scheme defines one or more entries of the matrix.

18. The apparatus as recited in claim 15, wherein the at least one analysis is asymptotic.

19. The method as recited in claim 15, wherein the step of performing at least one analysis comprises at least one of analyzing one or more transient memory elements and analyzing one or more persistent memory elements.

20. An article of manufacture for assessing the utilization efficiency of a portion of memory, the article comprising a computer readable storage medium containing one or more computer programs, which when executed implement the steps of:
obtaining one or more images of a portion of memory;
categorizing the one or more memory elements within each image into one or more application-neutral categories, wherein the one or more categories distinguish between data and structural overhead;
performing at least one analysis of the one or more categorized memory elements of the one or more images using a measure representative of the efficiency of utilization of the portion of memory; and
outputting one or more results of the analysis step.

* * * * *